United States Patent
Strietzel

(10) Patent No.: US 7,852,995 B2
(45) Date of Patent: *Dec. 14, 2010

(54) METHOD AND APPARATUS FOR SELECTIVELY PROVIDING MESSAGES IN TELECOMMUNICATIONS SYSTEMS

(75) Inventor: Jonathan Strietzel, Long Beach, CA (US)

(73) Assignee: Network Directory Sciences LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,313

(22) Filed: Apr. 27, 2010

(65) Prior Publication Data

US 2010/0195809 A1 Aug. 5, 2010

Related U.S. Application Data

(63) Continuation of application No. 12/364,940, filed on Feb. 3, 2009, now Pat. No. 7,783,015, which is a continuation of application No. 09/585,460, filed on Jun. 1, 2000, now Pat. No. 7,489,768.

(51) Int. Cl.
*H04M 11/00* (2006.01)

(52) U.S. Cl. .............................. 379/93.12; 379/114.05; 379/114.13

(58) Field of Classification Search ............... 379/93.12, 379/114.05, 114.13
See application file for complete search history.

(56) References Cited

U.S. PATENT DOCUMENTS

| 4,811,382 A | 3/1989 | Sleevi |
| 4,850,007 A | 7/1989 | Marino et al. |

(Continued)

FOREIGN PATENT DOCUMENTS

| GB | 2186155 | 8/1987 |

(Continued)

OTHER PUBLICATIONS

Purser, B., "WindWire Launches WindCaster; Wireless Ad Network Delivers Marketing and Advertising Over the New Wireless Web Medium," WindWire, The Wireless Advertising Network, (http://windwire.com/news/pr_062700_2.html) Jun. 27, 2000.

(Continued)

*Primary Examiner*—Quynh H Nguyen
(74) *Attorney, Agent, or Firm*—Procopio Cory Hargreaves & Savitch LLP; Noel C. Gillespie

(57) ABSTRACT

A telecommunications advertising means is disclosed. The telecommunication advertising means includes an advertisement database coupled to a processing means. The advertisement database stores subscriber specific or third party advertisements that are selectively associated with communications in a telecommunications network. The selective association is carried out by the processing means. In one embodiment, a router is coupled to the advertisement database. The router routes communications from source to destination within the telecommunications network. The router also routes advertisements that have been associated with the communications to the sources and destinations of the communications. A telecommunications system is also disclosed. The telecommunications system comprises a network subsystem, which includes a telecommunications advertising means. The telecommunications advertising means comprises an advertisement database and a processing means.

20 Claims, 9 Drawing Sheets

U.S. PATENT DOCUMENTS

| | | |
|---|---|---|
| 4,868,865 A | 9/1989 | Ogawa et al. |
| 5,048,076 A | 9/1991 | Maurer et al. |
| 5,146,491 A | 9/1992 | Silver et al. |
| 5,150,399 A | 9/1992 | Yasuda et al. |
| 5,195,126 A | 3/1993 | Carrier et al. |
| RE34,380 E | 9/1993 | Sleevi |
| 5,333,186 A | 7/1994 | Gupta |
| 5,448,625 A | 9/1995 | Lederman |
| 5,539,809 A | 7/1996 | Mayer et al. |
| 5,557,658 A | 9/1996 | Gregorek et al. |
| 5,852,775 A | 12/1998 | Hidary |
| 6,026,368 A | 2/2000 | Brown et al. |
| 6,028,917 A | 2/2000 | Creamer et al. |
| 6,151,491 A | 11/2000 | Farris et al. |
| 6,157,814 A | 12/2000 | Hymel et al. |
| 6,181,927 B1 | 1/2001 | Welling et al. |
| 6,373,817 B1 | 4/2002 | Kung et al. |
| 6,377,664 B2 | 4/2002 | Gerszberg et al. |
| 6,505,046 B1 | 1/2003 | Baker |
| 6,512,919 B2 | 1/2003 | Ogasawara |
| 6,522,875 B1 | 2/2003 | Dowling et al. |
| 6,574,335 B1 | 6/2003 | Kalmanek et al. |
| 6,603,844 B1 | 8/2003 | Chavez et al. |
| 2002/0022476 A1 | 2/2002 | Go |
| 2002/0077130 A1 | 6/2002 | Owensby |

FOREIGN PATENT DOCUMENTS

| | | |
|---|---|---|
| JP | 57087661 | 6/1982 |
| WO | 9713352 | 4/1997 |
| WO | 9834392 | 8/1998 |
| WO | 0049793 | 8/2000 |

OTHER PUBLICATIONS

Purser, B., "WindWire Delivers Nation's First Live Wireless Advertising Solution," WindWire, The Wireless Advertising Network (http://windwire.com/news/pr_100300_html). Oct. 3, 2000.

Non-Final Office Action issued in U.S. Appl. No. 09/753,415 dated Sep. 25, 2003 (24 pages).

Non-Final Office Action issued in U.S. Appl. No. 09/753,415 dated Jun. 16, 2004 (27 pages).

Petersen, Andrea, "Coming to Phone Screens: Pitches, Privacy Woes," Wall Street Journal, p. B1, Jul. 24, 2000.

METHOD AND APPARATUS FOR SELECTIVELY PROVIDING MESSAGES IN TELECOMMUNICATIONS SYSTEMS

RELATED APPLICATIONS

The present application claims the benefit, as a continuation under 35 U.S.C. 120, of U.S. patent application Ser. No. 12/364,940 entitled, "Method and Apparatus for Telecommunications Advertising," filed Feb. 3, 2009, which is in turn a continuation of U.S. patent application Ser. No. 09/585,460, now U.S. Pat. No. 7,489,768, entitled, "Method and Apparatus for Telecommunications Advertising, filed Jun. 1, 2000, the entirety of which are incorporated by reference herein as is set forth in their entirety.

FIELD OF THE INVENTION

The present invention relates generally to telecommunications and, more particularly, to a method and apparatus for telecommunications advertising.

BACKGROUND

Currently, the area of telecommunications is rapidly expanding. As a result, new products and services are constantly coming into the market, which promise more information, of more relevance to an individual user, and presented in a more timely fashion. It is an exciting time for consumers interested in such products and services; however, such products and services can be very costly. For example, Personal Digital Assistants (FDA's) and cellular phones can cost hundreds of dollars depending on the features and functions included. Moreover, sending a megabyte of data content over a wireless network can cost hundreds of times what it costs to send the same data over a fixed network. Obviously, consumers would prefer that the costs come down, before they start using many of these new telecommunications products and services. Unfortunately, the providers of these products and services need more users before they can bring the costs down significantly. Advertising is one way to subsidize the costs of new products and services, thus making them more affordable for the consumer.

It has been suggested that in a telecommunications network, advertising messages could be applied to a calling party's line in between rings of the ringback signal. For example, such a system is disclosed in U.S. Pat. No. 4,811,382 issued to Sleevi (the Sleevi patent). The Sleevi patent further suggests that a message could be associated with the calling party based on the calling party's phone number, the called party's phone number, or the long distance carrier of either party. In addition, messages could be changed based on the time of day, or the day of the week or month. One drawback to these suggestions, however, is that only the calling party is targeted and the association of messages is based on a limited number of criteria. Moreover, only using the period in between the ringback signals limits the type and number of messages that can be played to the caller. Another drawback is that the suggestions above only contemplate a fixed analog telecommunications network. New telecommunications systems, however, provide expanded opportunity to provide advertisers with highly targeted advertising and to subsidize the costs to the consumer of the products and services associated with these new systems.

SUMMARY OF THE INVENTION

A telecommunications advertising means is disclosed. The telecommunication advertising means includes an advertisement database coupled to a processing means. The advertisement database stores subscriber specific or third party advertisements that are selectively associated with communications in a telecommunications network. The selective association is carried out by the processing means. In one embodiment, a router is coupled to the advertisement database. The router routes communications from source to destination within the telecommunications network. The router also routes advertisements that have been associated with the communications to the sources and destinations of the communications.

A telecommunications system is also disclosed. The telecommunications system comprises a network subsystem, which includes a telecommunications advertising means. The telecommunications advertising means comprises an advertisement database and a processing means.

A method of telecommunications advertising is also disclosed as well as various other embodiments of the telecommunications advertising means. These other embodiments and further features and advantages of the invention are described in detail below.

BRIEF DESCRIPTION OF THE DRAWINGS

In the figures of the accompanying drawings, like reference numbers correspond to like elements, in which.

DETAILED DESCRIPTION OF PREFERRED EMBODIMENTS

Figure 1:
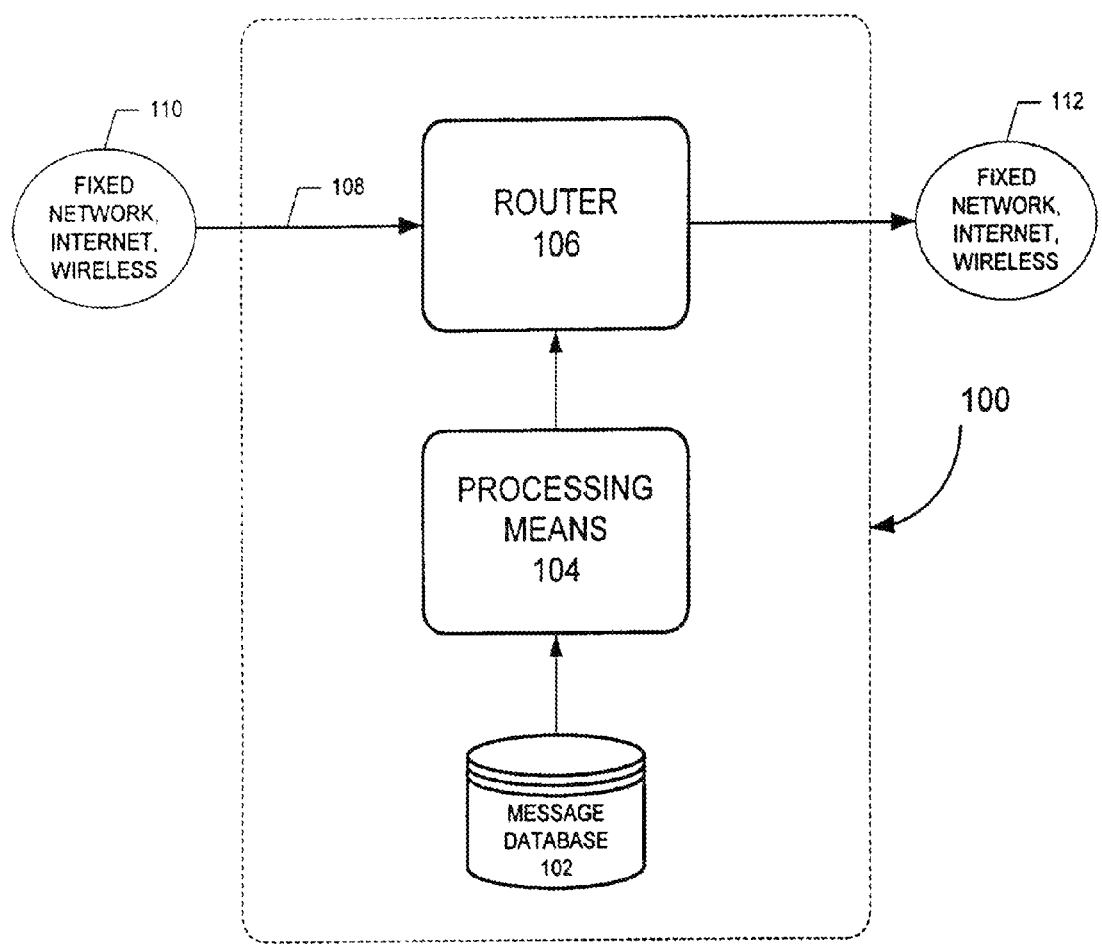
FIG. 1. illustrates a telecommunications advertising means in accordance with the invention.

FIG. 1 illustrates an example embodiment of a telecommunications advertising means 100 in accordance with the present invention. Telecommunications advertising means 100 is preferably an integral part of a telecommunications service provider's network and comprises an advertisement database 102, processing means 104, and router 106. Advertisement database 102 stores advertisements that can be played to system users at appropriate times based on appropriate criteria. In one implementation, the advertisements may comprise messages that are specific to a certain subscriber, or messages that are advertisements from third party advertisers. Processing means 104 selectively associates at least one advertisement in advertisement database 102 with incoming communications 108. For example, in one implementation processing means 104 associates an advertisement with a source 110 of incoming communication 108. In another implementation, processing means 104 associates an advertisement with a destination 112 associated with incoming communication 108, and, in a further implementation, processing means 104 associates an advertisement with both source 110 and destination 112 of incoming communication 108. In each of the above implementations, processing means 104 may actually associate multiple advertisements with source 110 and/or destination 112 of incoming communication 108, as opposed to a single advertisement.

Router 106 receives incoming communication 108 and connects it to the appropriate destination 112. Router 106 may, for example, be part of a fixed-line telecommunications network, such as a PSTN or ISDN, which generally connect ordinary telephone sets together via switching centers. In this case, telecommunications advertising means 100, and therefore router 106, may be included in such a switching center. In the typical fixed telecommunications network example, the switching center is normally a telephone company facility called a central office, but the switching center may be a toll office, a private branch exchange (PBX), or the like.

Figure 2:
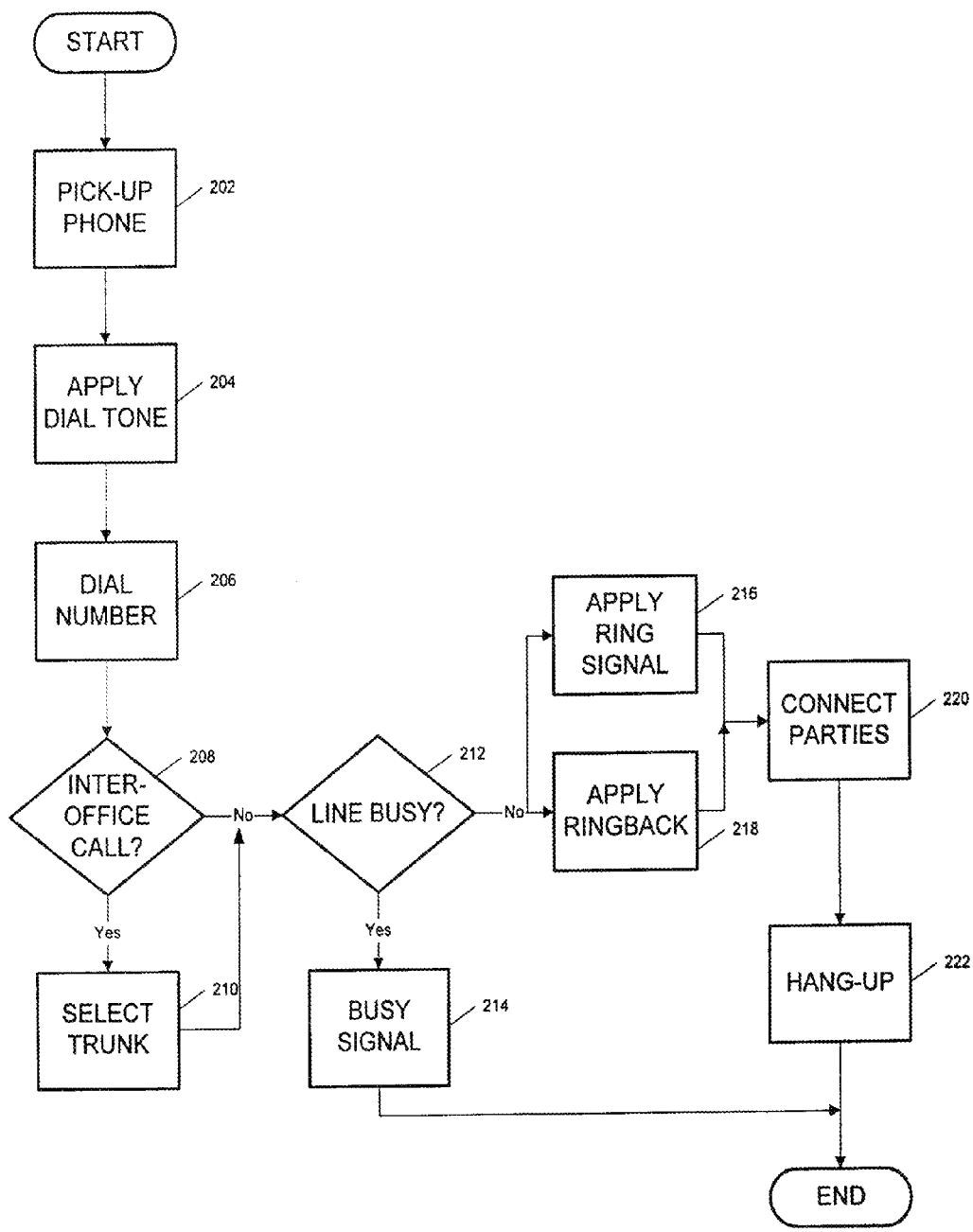
FIG. 2. is a process flow diagram illustrating the operation of a fixed-line telecommunications network.

A typical process by which router 106 would function within a switching center is illustrated by the steps in FIG. 2. First, in step 202, the calling party removes his telephone from the telephone hook, which closes the switch hook contacts and informs the local switching center of a request for service. As those skilled in the art will appreciate, however, the request for service may also be generated in a variety of other ways that are well known in the art. For example, for cordless phones, the request for service signal may be generated by pressing a TALK or CALL button. Similarly, some phones include a NEW CALL button for initiating service. Accordingly, the present invention is not limited to any particular manner of generating a request for service signal. The request for service is an incoming communication 108 shown in FIG. 1.

In step 204, the switching center will apply a dial tone to the calling party's line and wait for the calling party to dial a number. In step 206, the number is dialed and the switching center interprets the digits making up the number. Some portion of the number, typically the first three digits, will indicate whether the call is an inter-office call or a same office call, i.e., whether the call needs to be routed through a second central office or not. Therefore, in step 208 the switching center determines if the call is an inter-office call, in which case an idle connection or trunk to the other central office is selected (step 210). In step 212, once the trunk is seized, or if no trunk was necessary because it is a same office call, the switching center determines the status of the called party's line. As best seen in FIG. 1, the called party is the destination 112 of incoming communication 108. If the telephone at the called party's location is busy, then a busy signal is applied to the calling party's line in step 214. If the telephone at the called party's location is idle, then, in step 216, a ring signal is applied to the called party's line in order to activate the ringer in the called party's telephone. Simultaneously, in step 218, a ringback signal is applied to the calling party's line. When the telephone is answered by the called party (step 220), the off hook status causes a termination of the ringback signal and the parties are connected. At the end of the conversation, the telephones are returned to their on hook status (step 222), and the lines and trunk are released.

Thus, in the fixed telecommunications network example, router 106 forms an integral part of the circuits and systems of the switching center. Processing means 104 may also be integrated into the circuits and systems making up the switching center. In fact, in some implementations processing means 104 may be merged with router 106. Advertisement database 102 may be a standalone database or may be integrated into the resources present within a particular switching center. Moreover, the components that makeup telecommunications advertising means 100 can actually be distributed throughout the network.

The following implementations are described in order to further illustrate the above possibilities. In one implementation, telecommunications advertising means 100 may be included in a switching center such as a central office. Depending on the particulars of the implementation, each component of means 100 may standalone within the central office or may be integrated into the circuits and systems that make up the central office. Alternatively, in another implementation the components comprising telecommunications means 100 may be distributed throughout central offices within the network. In other words, a router 106 may be present in each of a plurality of central offices making up the fixed telecommunications network. Advertisement database 102 and processing means 104 may, however, be contained within one particular central office, or distributed along with router 106.

Although source 110 has been described above as a telephone set, source 110 of incoming communication 108 is not limited to a telephone set. In other implementations, for example, source 110 is a desktop computer, a laptop, a fax machine, or an interface to an entirely different communications system. With regard to the latter, traditional fixed networks are interfaced to a variety of modem telecommunication networks from which incoming communication 108 may be generated. Thus, for example, source 110 may also be a wireless network, a local loop, a paging network, or a Local Area Network (LAN). As will be discussed in relation to further embodiments, each of these networks contains at least one interface to a fixed network. Therefore, each of these network types may act as source 110 of incoming communication 108 in various implementations of means 100.

The switching center itself is not limited to a typical PSTN or ISDN type of network switching center. For example, telecommunications advertising means 100 may be integrated into a wireless system or the Internet. In these implementations, the method of identifying destination 112 and of connecting source 110 thereto are different, but the basic approach is the same. In implementations involving the Internet, telecommunications advertising means 100 may be included within a router or plurality of routers used to route traffic across the Internet. In this case, the Internet address or domain name is used to identify source 110 and destination 112, instead of the digits of the telephone number dialed. It will be apparent to those skilled in the art, therefore, that incoming communication 108 is not limited to voice communications, but may also include data communications. In fact, depending on the implementation, incoming communication 108 may be a video communication, a paging communication, an email communication, or any combination of the above. Other than what type of advertisements may be sent, the type of communication does not impact the functionality of telecommunication advertising means 100.

In addition to connecting source 110 with destination 112, router 106 also routes advertisements associated with source 110 to source 110 and any advertisements associated with destination 112 to destination 112. Because the user is captive, the user must hear or observe the message. In this way, it can be assured that the advertising message reaches its intended target.

Looking at FIG. 2, there are several points, depending on the desired implementation, that a message may be associated with and sent by router 106 to source 110, destination 112, or both. For example, looking at step 204, an advertisement can be associated with incoming communication 108 and sent to source 110 just prior to the dial tone being applied.

Alternatively, the message can actually replace the dial tone. This is possible because a dial tone alerts the user to the fact that the user is connected to the network and may dial a number. Thus, this implementation would use the advertisement to alert the user of the network connection. Once the advertisement finishes playing, the user dials the desired number.

In an alternative implementation, a short advertisement replaces the ringback signal in step 218. Typically, the ringback signal consists of short rings every few seconds. In this implementation, therefore, a short advertisement is played in place of the rings. In another implementation, once the called party's telephone goes off hook in step 220, a short advertisement is played to the calling party. The playing of the short advertisement indicates to the calling party that the called party has answered and that the calling party may begin the conversation after the advertisement has played.

An advertisement may also be associated with the called party (destination 112). In this implementation, the advertisement is routed to the called party when the called party's telephone goes off hook. The calling party preferably continues to receive the ringback signal, or substitute advertisements, until the advertisement is finished on the called party's side, at which point the conversation may begin. Alternatively, when the called party's line goes off hook a short advertisement may be played for both parties, so that the conversation may begin after the advertisements are complete. Ideally, the advertisements would last the same amount of time, to avoid any feeling of disconnect by one of the parties.

In additional variations, the implementations described above may be further combined. For example, an advertisement in place of the dial tone may be combined with short advertisements in place of the ringback signal, which may be further combined with an advertisement played to one or both parties when the called party's telephone goes of hook. In a slightly different implementation, instead of the ringback signal or substitute advertisements, a continuous advertisement may be played to the calling party after the calling party dials the number. When the called party's telephone goes off hook, the advertisement will stop, and conversation can then begin. This continuous advertisement may be combined with an advertisement played before or in place of the dial tone. In addition, it may be combined with an advertisement played for the called party, when the called party picks up. Those skilled in the art will appreciate, therefore, that the implementations discussed can be combined in a variety of ways in order to deliver to each party a variety of different messages of different lengths, and at different times during the call initiation process. In this respect, the calling party may receive the same advertisement or advertisements as the called party, or the advertisements may be different. It can be assured, however, that each party will hear or observe the advertisement or advertisements, just as it is assured that each party would hear the dial tone or ringback signal. This is because the parties must pay attention at the specific times such advertisements would be playing in order to complete the call.

In order to ensure that the advertisements are well targeted to the particular called or calling party, processing means 104 preferably associates advertisements stored in advertisement database 102 based on information about the parties. As mentioned previously, advertisements stored in advertisement database 102 may be subscriber specific advertisements or third party advertisements. In particularly preferred implementations, a specific advertisement is associated based on the specific subscriber. For example, a certain subscriber may want a specific message played for any outgoing call, incoming call, or both. This type of implementation will be particularly advantageous for business subscribers. By way of illustration, a business subscriber may want to have a specific short message, such as the business name or jingle of the business, routed back to the source of each incoming call. Alternatively, a business may want a specific message or messages played each time an outgoing call or interoffice call is originated on one of the business' lines. This concept may be extended in order to allow third party advertisers to target specific users or groups of users for specific advertising messages. For example, a particular advertiser may pay the telecommunications provider to play an advertising message to each party placing a call in the telecommunication provider's network.

Money collected from advertisers or from business subscribers to play their advertising messages is preferably used to offset the cost of the service to each regular subscriber to the telecommunications network. Alternatively, the system 100 may be set up so that money collected from advertisers and businesses is used to offset the cost of subscribers that have agreed to receive advertising messages as part of the call process.

The implementations, as described so far, have not involved highly targeted advertising. Means 100 may be used, however, to facilitate highly targeted advertising. For example, a certain advertiser may want to limit the playing of his advertisement to subscribers in certain geographic areas. Further, the advertiser may have advertising messages in multiple languages and would therefore want to play a different message depending on the primary language of the targeted subscriber. These types of implementations may be achieved by programming processing means 104 to selectively associate advertisements stored in advertisement database 102 to the calling and/or called parties based on predetermined criteria. One example of selective association has already been discussed, i.e., playing a message specific to a certain business to callers calling the business. Other example criteria, in addition to language and geography, that can be employed to increase the selectivity of the advertising message played are the source 110 of incoming communication 108, the type of incoming communication 108, the time of day of communication 108, and the destination 112 of incoming communication 108. With respect to source 110 and destination 112, a wide variety of factors can be used, including, for example, area code, account type, average monthly phone bill, frequent phone numbers called, address, etc.

Information associated with source 110 of incoming communication 108, such as the corresponding number, is preferably used to determine if source 110 is initiating a same office call, an inter-office call, or a call originating in a different type of network such as a cellular network, a LAN, a local loop, or a paging network. Third party advertisements can then be associated with incoming communication 108 based on the source, and in a manner that increases the selectivity of the advertising so as to produce a better return on the advertising dollars spent. Similarly, the type of communication can play a useful role in increasing the selectivity of the advertisement. As mentioned previously, the type of communication is not limited to telephone calls, but may include data communication, video communication, paging communication, email, voice/audio communication, or any combination. Thus, by taking into account the source and type of the communication, a more selective approach may be employed to associate specific advertisements from specific advertisers with specific communications.

Similar information about the destination of incoming communication 108 may also be advantageously integrated into the message association process. In a further implementation, information related to preferences for products and services, as well as personal data, is gathered for each subscriber and used to make the association even more highly targeted. It should be noted that these criteria used in the association process apply to both advertisements sent to source 110 of incoming communication 108 and advertisements sent to destination 112 of incoming communication 108.

Of course, the basic principles are the same for implementations that involve other than the traditional fixed telecommunications network implementations. For example, networks relying in whole or in part on wireless communication lines would still operate in the same manner. In the case of the Internet, the selectivity can be even more beneficial in that the Internet brings together a host of communication methods and devices. Thus, there is an even broader range of selection criterion that can be used in the association of advertisements with communications. Additionally, the advertisement can be in a variety of formats. For example, the advertisement may be an audio advertisement, it may be a jingle, a textual message, a video message, a graphic message, or a combination of these messages, depending on the desired implementation. Thus, in an implementation involving the Internet, where multimedia capable computers are usually used to access the network, each of these message types would be applicable. But even in the traditional telecommunications network, video conferencing is possible, wherein text, video, or graphical advertisements are employed. New digital technologies for fixed networks, such as ISDN, also make implementations involving a variety of advertisement types possible. The advantage of certain types of advertisement messages in relation to certain types of networks will be discussed more fully in relation to further embodiments discussed below.

An alternative embodiment of the invention is now described in connection with FIG. 3. As mentioned above, in some implementations source 110 of incoming communication 108 is actually a different type of network, such as a cellular network, paging network, local loop, or LAN. In the alternative embodiment of the invention shown in FIG. 3, telecommunications advertising means 100 is contained within one of these different source networks.

Figure 3:
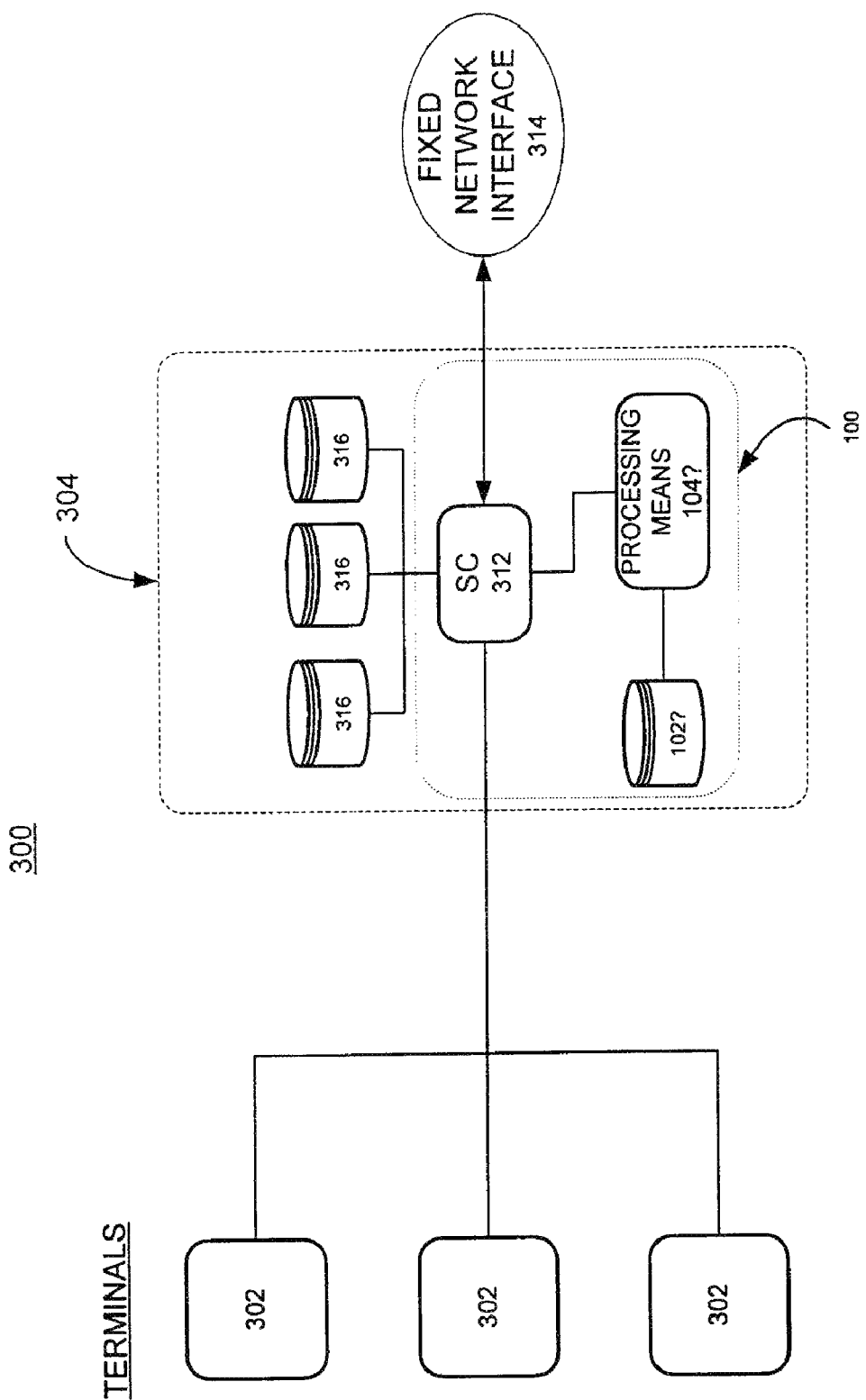
FIG. 3. illustrates a telecommunications system that includes a telecommunications advertising means in accordance with an embodiment of the invention.

The general situation is illustrated in FIG. 3. According to FIG. 3, one of these source networks 300 generally consists of a switching center 312, which is interfaced to a plurality of user terminals 302. Switching center 312 is typically contained within a network subsystem 304, which also includes a plurality of administration means 316. Switching center 312 handles the switching of communications between terminals 302 and between terminals 302 and fixed network users. Switching center 312 is interfaced to fixed network users through fixed network interface 314. The fixed network may, for example, be a fixed telecommunications network such as a PSTN or ISDN. Administrative means 316 contain the administrative information for all terminals 302. The administrative information is used by switching center 312 to control communication within network 300.

Network subsystem 304 further comprises an advertisement database 102 and a processing means 104. Like the previous embodiment, advertisement database 102 stores advertisements that are played to users of terminals 302 at appropriate times based on appropriate criteria. Processing means 104 associates at least one advertisement from advertisement database 102 with each communication within network 300. In the embodiment illustrated in FIG. 3, the functions of router 106, in the previous embodiment, are performed by switching center 312. Therefore, switching center 312, advertisement database 102, and processing means 104 form a telecommunications advertising means 100 similar to that depicted in FIG. 1.

In network 300, incoming communications are analyzed to determine the source, destination, type of communication, time of day, etc., then processing means 104 selectively associates at least one advertisement with the source and/or destination of the communication based on the information determined. The advertisement or advertisements are advertisements unique to a specific subscriber, or a third party advertisement. For example, when a terminal to terminal communication is initiated, processing means 104 may associate an advertisement with the source and route it back to the source terminal 302. Additionally, an advertisement from advertisement database 102 may be associated with the destination terminal 302 and routed to that terminal. The advertisement may be the same for both source and destination or it may be different depending on the implementation. If the communication is initiated with a fixed network user, then this may cause the advertisements associated with either the source, or destination, or both to be different than in the terminal to terminal situation.

When communication is established between a terminal 302 and a fixed network user, special considerations may arise. This is because the fixed network may also comprise a telecommunications advertising means 100. Therefore, processing means 104 must be capable of resolving which advertising means 100 will associate an advertisement or advertisements with the communication. Looking at specific implementations in the discussion below will further develop the embodiment depicted in FIG. 3.

Figure 4:
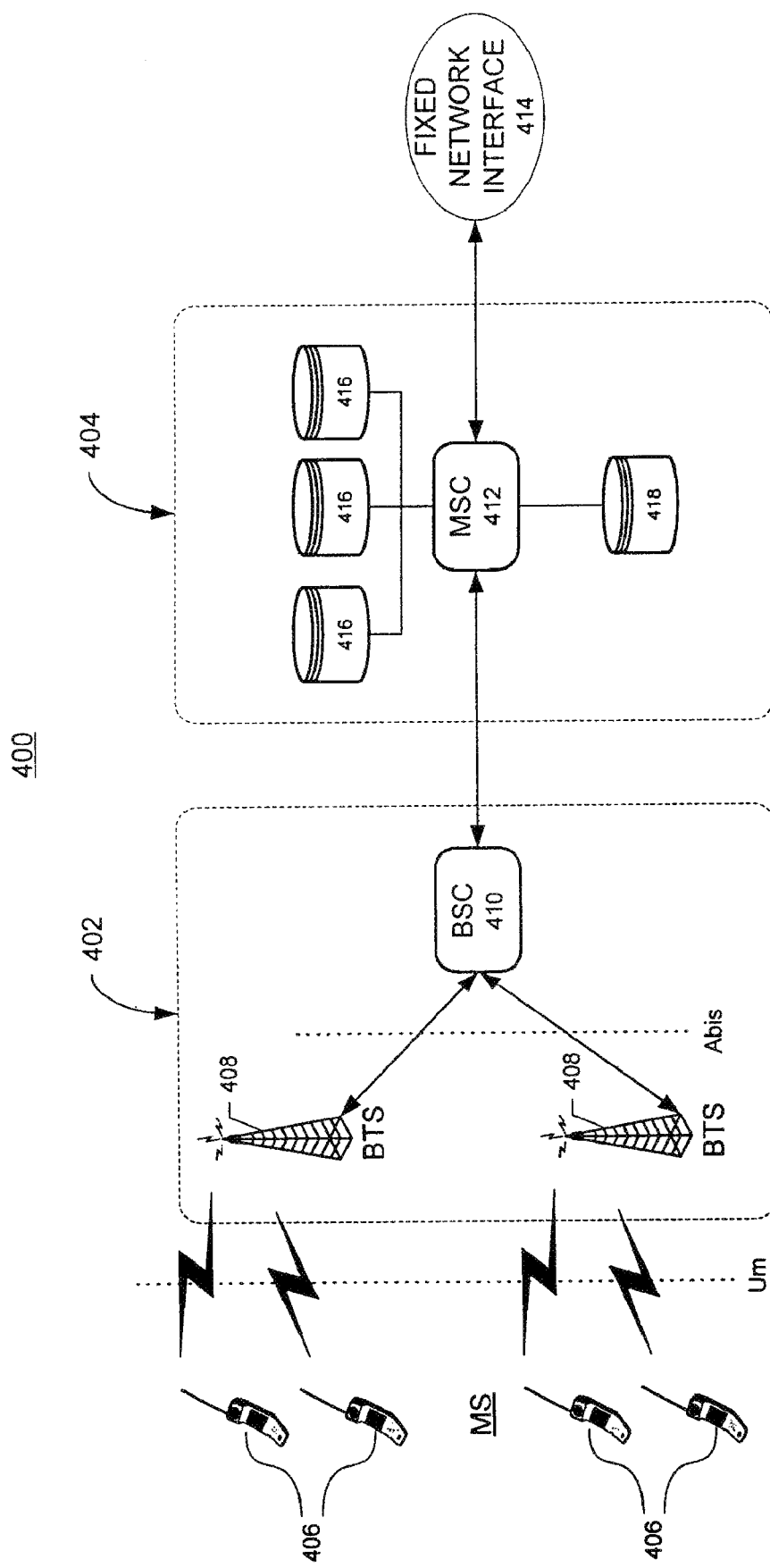
FIG. 4. illustrates a cellular telecommunications system that includes a telecommunications advertising means in accordance with another embodiment of the invention.

First, FIG. 4 illustrates a cellular network 400. In this implementation, the terminals 302 comprise wireless mobile stations (MS) 406. Cellular network 400 further comprises base station subsystem 402 and network subsystem 404. MS's 406 communicate with base station subsystem 402 across a Um interface, which is also known as the air interface or radio link. Base station subsystem 402 includes a plurality of base station controllers (BSC) 410 and a plurality of base station transceiver stations (BTS) 408. Each BTS 408 houses a radio transceiver that defines a cell and handles the radio link with a plurality of MS's 406 within the cell. Each BSC 410 manages the radio resources, such as channel setup and channel handoff, of one or more BTS's 408. Each BTS 408 communicates with a BSC 410 over a standard (Abis) interface.

Network subsystem 404 comprises mobile switching center (MSC) 412 as well as a plurality of administrative registers 416 and advertisement database 418. Network subsystem 404, of which MSC 412 is the main part, performs the switching of calls between the mobile users and between mobile and fixed network users. MSC 412 acts like a normal switching node of a fixed network, but additionally provides the functionality needed to handle a mobile subscriber, such as registration, authentication, location, updating, handoffs, and call routing. MSC 412 also provides the connection to a fixed network through network interface 414. In the implementation shown, MSC 412 also performs the functions of selectively associating advertisements in advertisement database 418 with communications within network 400. In alternative implementations, a separate processing means may be used to perform this function. Administrative registers 416 contain all the administrative information of each subscriber registered in network 400, along with the current location of each MS 406. It should be noted that some or all of registers 416 may also be implemented as part of MSC 412. Alternatively, each register 416 and MSC 412 may be implemented as independent units. Administrative registers 416, together with MSC 412, provide call routing and roaming capabilities.

When a MS 406 places a call to another MS 406, the call is routed through MSC 412. Unlike the fixed network embodiment, the caller initiating the call does not usually receive a dial tone indicating connection to the network. A caller will dial the number desired and then place MS 406 to their ear. MSC 412 will determine, based on the number dialed, that the destination of the call is another MS 406. If the called party is using their MS 406, or if the called party's MS 406 is turned off, then a busy tone or a message indicating the unavailability of the called party is routed back to the calling party. If, on the other hand, the called party's MS 406 is on and is idle, then a ring signal is applied to the called party's MS 406 and a ringback signal is applied to the calling party's MS 406. When the called party answers, the ring and ringback signals are terminated and the conversation can begin.

Because there is typically no dial tone, an advertisement from advertisement database 418 cannot be played prior to or in place of the dial tone. But an advertisement or advertisements from advertisement database 418 can be, depending on the implementation, substituted for the rings in the ringback signal, played in between the rings of the ringback signal, or substituted for the ringback signal entirely, i.e., one long advertisement or series of short advertisements is played for the caller until the called party picks up as opposed to the traditional ringback signal. In a preferred implementation, once the called party picks up, an advertisement is played for one or both parties after which, the conversation can begin. In addition, implementations may combine, in different ways, the playing of messages at these various points during the call.

MSC 412, or a standalone processing means in those implementations that include one, selectively associates advertisements in advertisement database 418 based on, for example, information related to the caller, or source of the call, and/or the destination. As in the fixed network example, advertisements may also be selectively associated based on the time of day, geographic location, primary language, or the identity of the specific caller or called party. In one implementation, the message associated comprises billing information for one or both parties. For example, the party's balance and minutes remaining for the month are played for the party. In another implementation, a specific party or subscriber specifies the message or messages to be played under certain circumstances. For example, a business may pay to have the business' jingle played to any caller using a MS 406 to call the business. In yet another implementation, the network advertises new calling plans or special promotions are played. In particularly preferred implementations, third party advertisers may pay to have advertisements related to their products and services played during the call. Money generated from this type of advertising may be used to subsidize the cost of products and services for subscribers to network 400.

Figure 5:
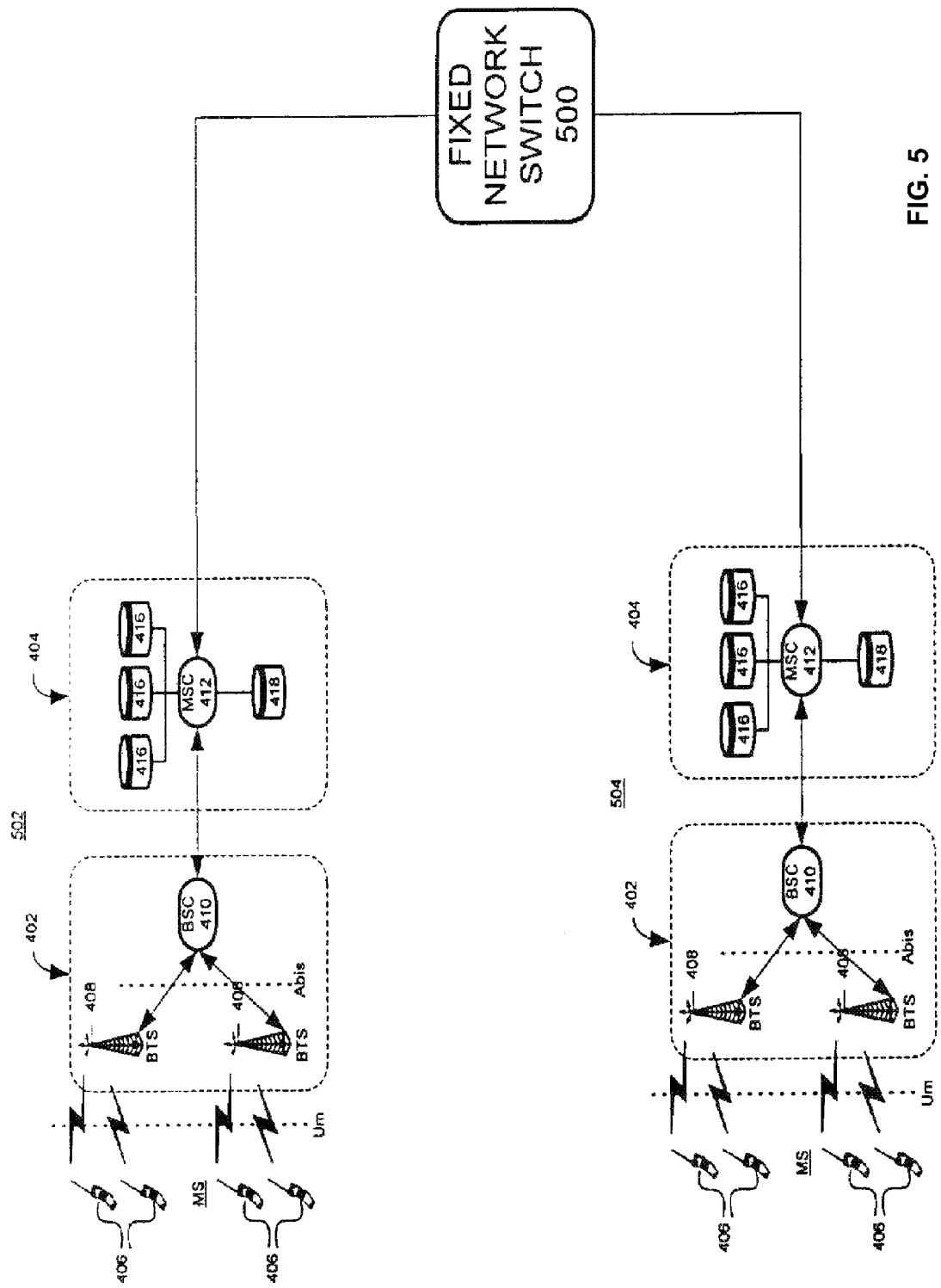
FIG. 5. illustrates a plurality of cellular telecommunications system interfaced to a fixed network switch, wherein each cellular telecommunications system includes a telecommunications advertising means in accordance with the embodiment of the invention illustrated in FIG. 4.

Unlike routing in the fixed network example, where a terminal is semi-permanently wired to a central office, a mobile user can roam nationally and even internationally. Therefore, the directory number associated with a particular MS 406 usually contains a country code as well as identification of the associated home network 400. When a fixed network subscriber initiates a call to a mobile user, the fixed network switching center interfaces with one or several MSC's 412 in order to connect the call. As a result, the steps are very similar to the ones illustrated in FIG. 2, except multiple switching centers from multiple networks are involved. The situation gets even more complicated when, as illustrated in FIG. 5, a mobile user in one cellular network 502 initiates a call to a user in a second cellular network 504. In this case there are network switches from three different networks and each may have its own telecommunication advertising means 100. To deal with the potential conflict, each switch 412 and 500 preferably incorporates protocols for determining whether to associate an advertisement with a particular user under these conditions. In the typical implementation, for example, each switch 412 only associates an advertisement with the MS 406 (source or destination) that is in the same network, and fixed network 500 does not associate any advertisements with the communication.

It should be noted that MS's 406 used in cellular systems present unique possibilities for communicating advertisements to subscribers. For example, one implementation takes advantage of the fact that the ring the called party hears is completely programmable. Therefore, in this implementation the ring is replaced by an advertisement. This can be accomplished by storing potential advertisements in each MS 406. When MSC 412 associates a particular advertisement, it sends a command to a called party's MS 406 to play that advertisement in place of the ring. MS 406, accesses the stored advertisements and plays the appropriate one at the appropriate time. The ability to program a MS 406 over the air to constantly update which advertisements are stored in MS 406 may also be taken advantage of in this implementation.

Another unique method of communicating messages to mobile users that may be employed in the present embodiment takes advantage of the fact that a large number of MS's 406 are equipped with a display device. Therefore, the present embodiment also contemplates the use of graphic or text advertisements that are displayed on the user's display device. For example, a company may pay to have its trademark flashed on the screen of each MS 406 whenever there is an incoming call, or whenever a user pushes send to initiate a call, or a combination thereof. The use of graphic or text advertisements is also incorporated in implementations involving a second example type of network 300 as illustrated in FIG. 6.

Figure 6:
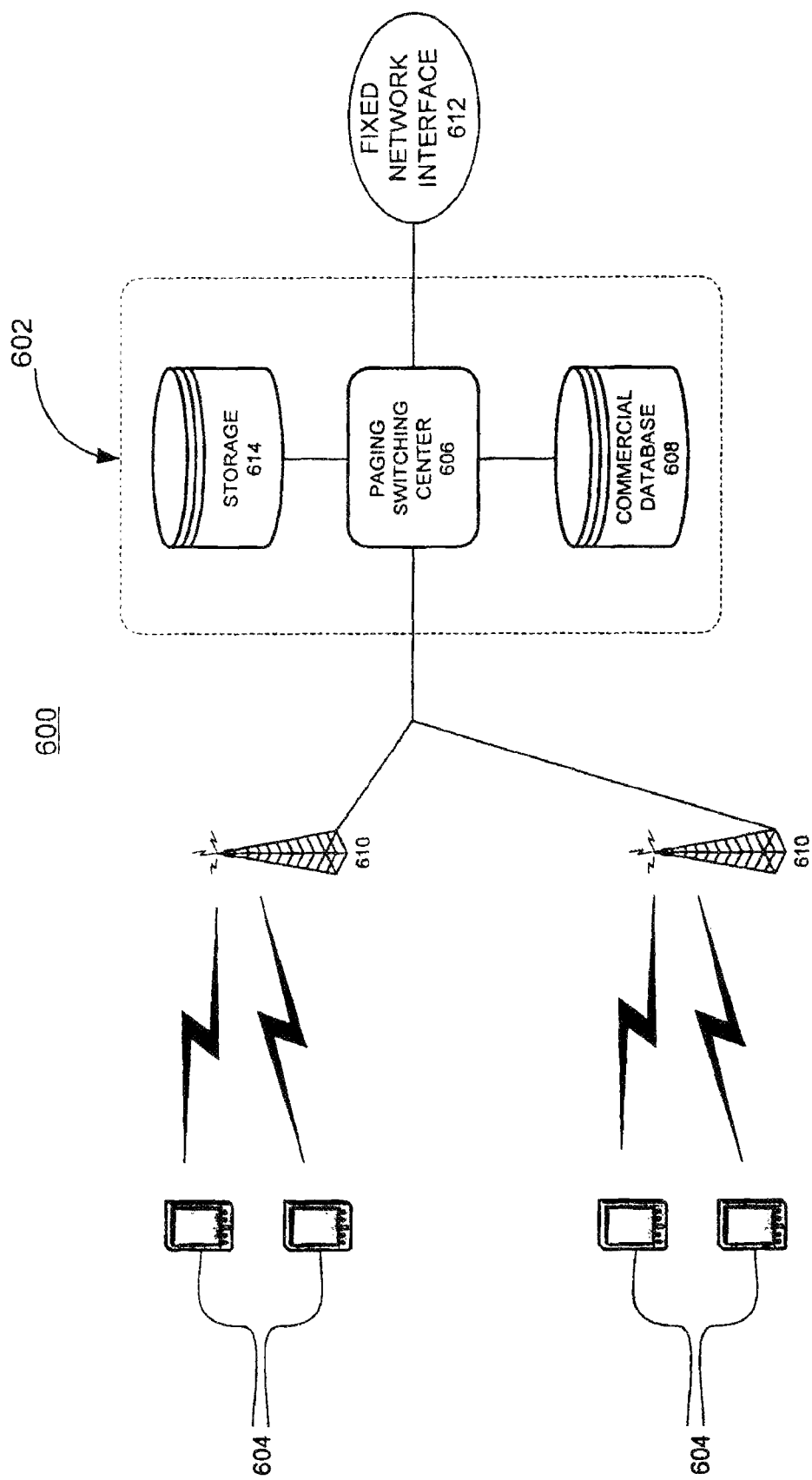
FIG. 6. illustrates a paging network system that includes a telecommunications advertising means in accordance with another embodiment of the invention.

FIG. 6 illustrates a paging network 600 comprising paging devices 604, paging sites 610, and control point 602. The heart of control point 602 is paging switching center 606, which connects paging network 600 to the local telephone company through fixed network interface 612. Fixed network interface 612 is typically several telephone line connections, which can be direct inward dial circuits, T1 circuits, or network connections. These different types of connections are mixed together in order to optimize the system and maintain overhead costs. Paging switching center 606 outputs paging and control data to paging sites 610 in order to successfully implement the paging operation. The link between paging switching center 606 and paging site 610 is either an RF link of fixed line connection. Paging sites 610 transmit the paging information to all of the paging devices 604 in the area. Alternatively, the links between paging sites 610 and paging switching center 606 may be implemented as a satellite link system. In addition, control point 602 includes advertisement database 608, and optionally storage 614 if paging network 600 includes voicemail capabilities. In certain implementations, a stand alone processing means is included for selectively associating advertisements stored in database 608 with communications within network 600. In the implementation shown in FIG. 6, however, paging switching center 606 performs the function of selectively associating advertisements.

Figure 7:
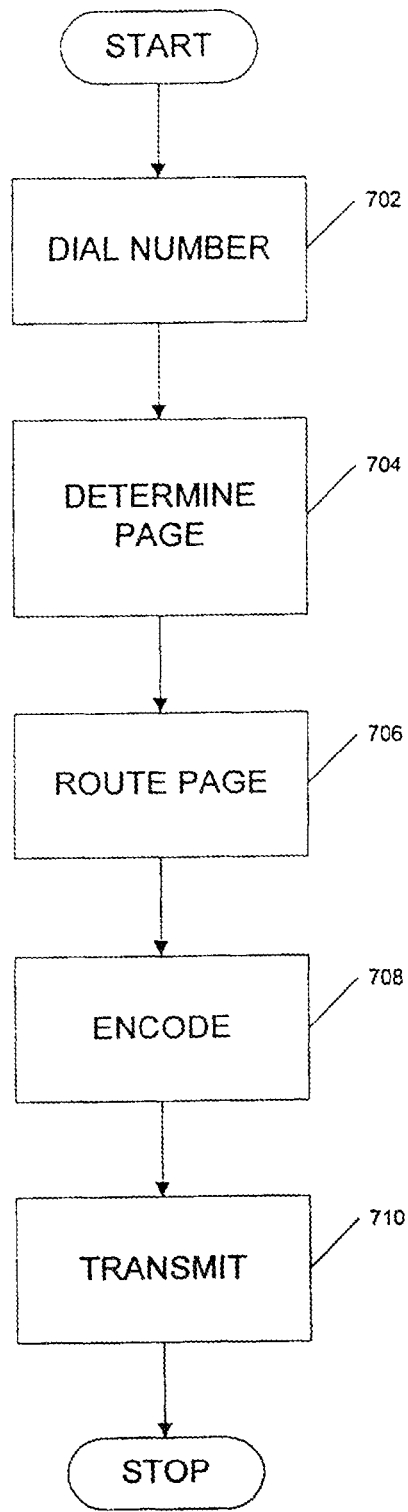
FIG. 7. is a process flow diagram that illustrates a process for communicating a paging message.

The process involved in completing a page is illustrated in FIG. 7. First, in step 702, a person dials a number corresponding to a paging device 602. Then in step 704, the switching center of the local Telephone Company determines that the number dialed corresponds to a paging device 602. In step 706, the Telephone Company switching center routes the page to paging switching center 606. Paging switching center 606 encodes and processes the page and outputs paging information to the paging sites 610 in step 708. Paging sites 610 then transmit the page to the user in step 710. Because paging networks 600 traditionally involve one way paging, and paging terminals traditionally use a vibration or audible beep to indicate an incoming page and not ring indicators, paging switching center 606 preferably selectively associates graphic or text advertisements stored on database 608 with each incoming page received through interface 612. Thus, for example, as with the previous embodiment, a company may pay to have its trademark displayed on paging device 602 each time a page is received.

Two way paging, pagers with multiple programmable ring indicators, and pagers equipped with voice audio capabilities, however, expand the possible methods of implementing a telecommunications advertising means 100 within a paging network 600 to many of the various implementations described above in connection with prior embodiments. In pagers with voice audio capabilities or voicemail, for example, an audible advertisement, such as a jingle or slogan, may be selectively added by switching center 606 to the beginning of each voice page received.

It will be apparent to those skilled in the art that other implementations of network 300 will involve other network systems, such as local loops, wireless local loops, or LAN's. Moreover, the type of communication involved, in addition to calls and pages, incorporates video and text communication depending on the system implementation. Each of the implementations discussed may also incorporate a means to acquire more information about a product or service advertised during the communication. For example, a calling or called party in a telephone network, a cellular network, or a paging network can stay on after the communication transaction is over and receive options or a menu allowing the party to select to receive more information about a particular product or service. In certain other implementations, the user can actually select to be connected directly to the company offering the products or service.

Figure 8:
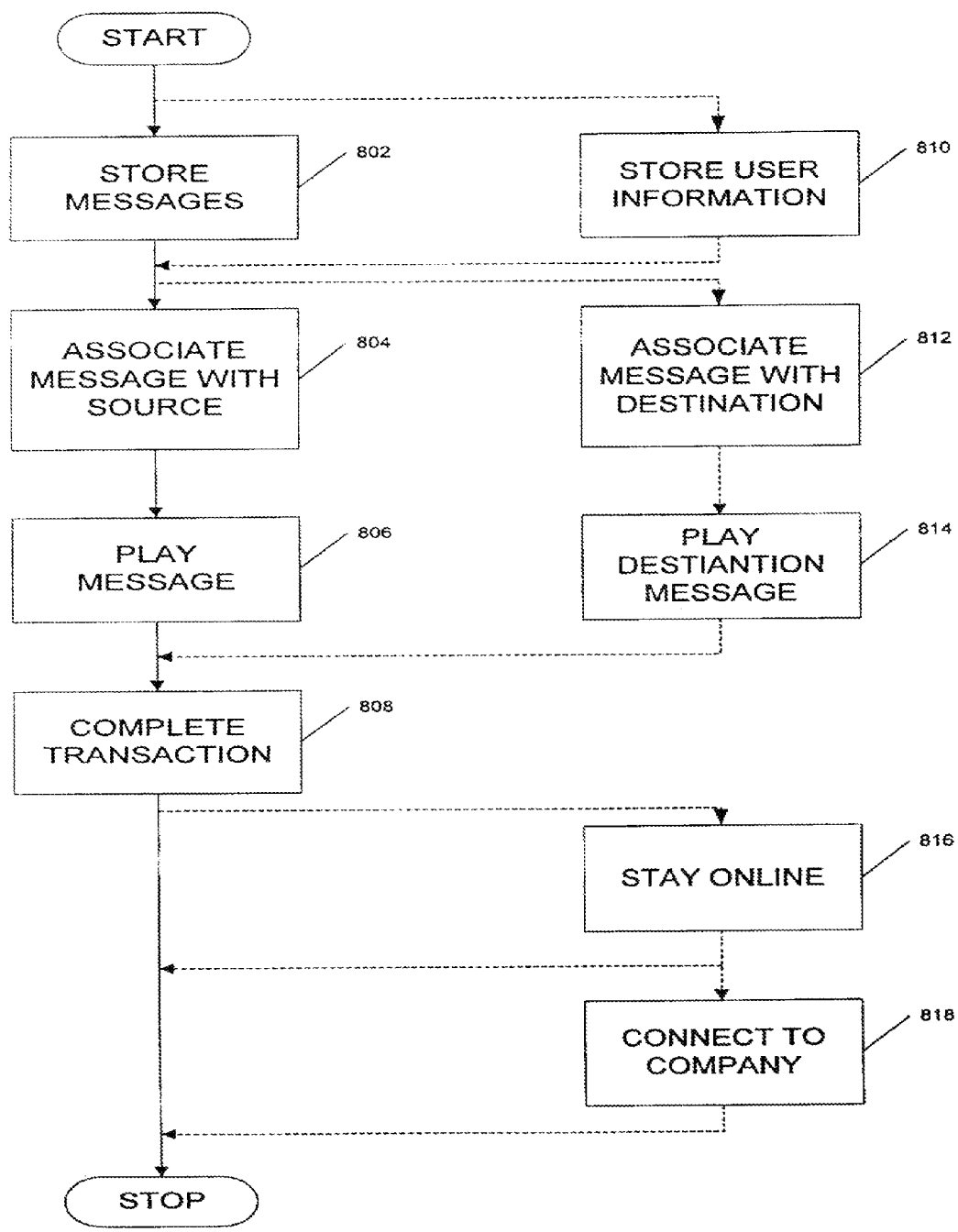
FIG. 8. is a process flow diagram that illustrates a method of telecommunications advertising in accordance with the invention.

There is also provided a method of telecommunications advertising comprising the steps illustrated in FIG. 8. First, in step 802, a plurality of advertisements to be associated with communications within a telecommunications network are stored. In preferred implementations of the embodiment, information related to users within the network is also stored, as illustrated by optional step 810 in FIG. 8. Depending on the particulars of the implementation, this user information may comprise some or all of the following pieces of information: a user's primary language, a user's preferences, a user's communications provider, a user's communication means, a user's communication plan, and a user's geographic location. A user's communication means refers to the device the user uses when communicating over the telecommunications network. The device could be, for example, a telephone, cellphone, PDA, or computer depending on the system. Most of the user information is known when a user agrees or signs up for a particular communications service. User preferences, however, may be obtained, for example, through the use of a user questionnaire or fact sheet. For example, when a user signs up for a service they are preferably asked to provide personal information such as age, salary, marital status, number of children, etc., and buying preferences such as how much the user spends on certain items, what type of items the user typically purchases, what type of items the user would like to receive information on, and so on. All of the information related to the user is then preferably stored and used in the next step.

In step 804, an advertisement or advertisements are associated with a source of a communication within the telecommunications network. For example, an advertisement may be associated based simply on the identity of the source as determined by the number or address associated with the source. Preferably, however, the identity is combined with the user information in order to selectively associate a highly targeted advertisement, such as an advertisement for a particular product, with the source. In step 806 the advertisement is played for the user associated with the source of the communication.

An advertisement is also preferably associated with the destination of the communication. This step is illustrated as optional step 812 in FIG. 8. If the user associated with the destination is also a subscriber to the telecommunications network, then user information is also preferably used to associate an advertisement with the destination. If the user is not a subscriber, then the identity of the destination user will typically be the primary factor used in associating the advertisement or advertisements. In optional step 814, the advertisement is then played for the user associated with the destination. In step 808, after the advertisement or advertisements are played for the source and destination, the communication transaction is completed between the two parties. For example, the transaction may be a telephone call or email. After the advertisements are played the call or email would be put through to the other party. In the email example, the advertisement or advertisements could be attached or embedded in the emails themselves.

It is contemplated that the users of networks including a telecommunication advertising means 100 would be billed at a lower rate for the communication service due to the fact that the advertisements are included in the communication. Further, as illustrated by step 816 in FIG. 8, one or both users, depending on the implementation, may stay online and choose to receive further information with regard to one or more of the advertisements played during the communication transaction. For example, one or both users may wish to receive more information about the product or service advertised. In a particular preferred implementation of the method, the user may choose (step 818) to be connected directly to the company whose product or service was advertised. In this case, the telecommunications network connects the user to the company through the telecommunications network via the telecommunications means employed by the user.

In an alternative embodiment, the users are given the option to receive more information prior to the connection between source and destination. For example, after the advertisements are played for the user associated with the source, the user is given the option to receive more information relating to the advertised products or services. Depending on the implementation, the user may choose to receive the information immediately or to wait until after the communication transaction. In other sample embodiments, similar options are provided to the destination user as well. In alternative embodiments, one or both users are given the option to receive more information at various points during the communication transaction.

Figure 9:
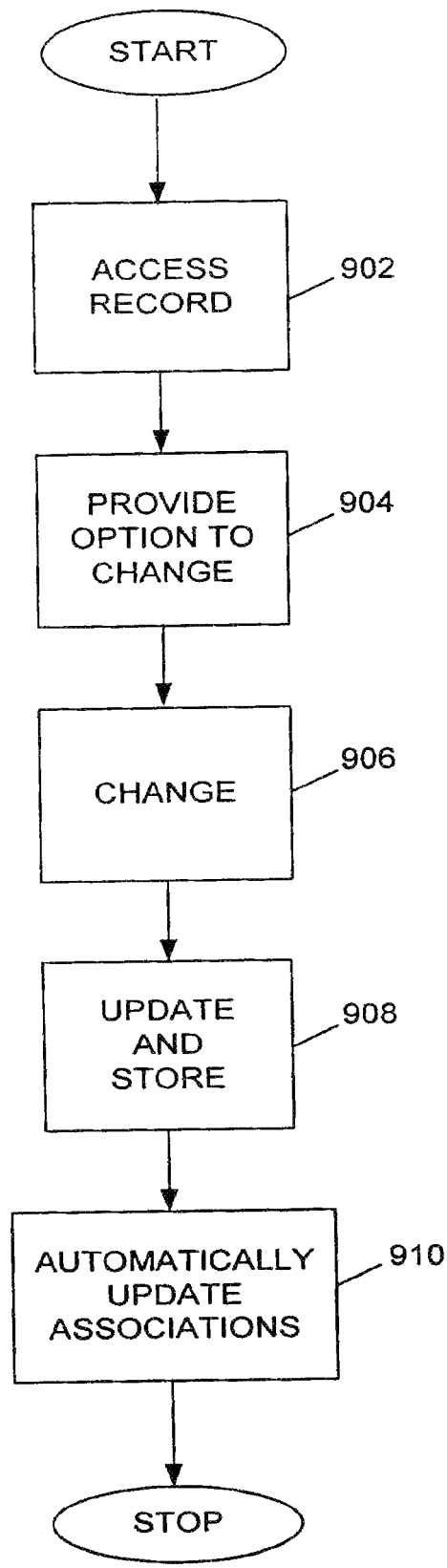
FIG. 9 is a flow chart illustrating a method for updating user preferences associated with a telecommunications advertising means in accordance with one embodiment

As illustrated in FIG. 9, there is also provided a method for updating user preferences associated with a telecommunications advertising means comprising the following steps: First, in step 902, a user accesses a record containing the user's preferences. In one sample embodiment, the record is part of a larger database that contains a plurality of records containing user information for users within a telecommunications network. In one sample implementation, the user accesses the record via the Internet. In this implementation, the user would, for example, go to a website where they could choose to access their user preference information. In a typical implementation, the user would need to supply a password of some sort in order to gain access to the information.

Once the user has gained access, the user has the option to change the preferences and user information contained in the record. This step is illustrated as step 904 in FIG. 9. Then, in step 906, the user changes the information they wish to change. For example, in implementations that use the Internet, the user accesses a screen or window, or series of screens or windows, from which they can change or select new information for the record. Depending on the implementation, the user preferences will relate to age, salary, marital status, number of children, etc., and buying preferences such as how much the user spends on certain items, what type of items the user typically purchases, what type of items the user would like to receive information on, and so on.

In step 908, the new information is automatically updated and stored in the record, which is automatically updated and stored in the database. In an additional sample embodiment, the record is accessed via telephone. The user again uses a password to access the information and is then provided with menu options to select new or updated information.

After the new information is updated and stored in step 908, the updated record is used, in step 910, to automatically update associations of advertisements to be played to the user. For example, the telecommunications advertising means is part of a telecommunications network. When the user initiates or receives a communication within the network, the user information is used to associate advertisements that are played to the user before, during, or after the communication. In step 910, the updated user information automatically updates which advertisements are associated with, and played to, the user.

While various embodiments of the invention have been presented, it should be understood that they have been presented by way of example only and not limitation. It will be apparent to those skilled in the art that many other embodiments are possible, which would not depart from the scope of the invention. For example, certain telecommunications network systems are described. Telecommunications technology, however, is constantly evolving, resulting in new systems and means for communicating. The present invention anticipates that changes in technology will occur, but the basic invention will continue to apply to newly developed systems.

What is claimed is:

1. A telecommunications system configured to replace or overlay a signal normally routed to the source of a communication when the communication is initiated by the source with an audio message, the telecommunications system comprising:
   a message database that stores subscriber specific or third party audio messages; and
   a processor coupled with the message database, the processor configured to:
      classify the source of the communication, wherein classification of the source of the communication is based at least in part on identifying information associated with the source, the identifying information including at least one of a telephone number associated with the incoming communication and an area code associated with the incoming communication;
      select an audio message based on the classification and based on an association between the source and the selected audio message, the association made by a user associated with the destination of the communication;
      send the selected audio message to the source of the communication, the destination of the communication, or both, such that the audio message can be played to the source, the destination, or both, before the destination responds to the communication; and
      cause the audio message to stop playing when the destination responds to the communication.

2. The telecommunications system of claim 1, wherein the processor is further configured to determine whether the destination is available, and if the destination in not available, then to not send the audio message to the source.

3. The telecommunications system of claim 1, wherein the signal normally routed to the source is a ringback signal.

4. The telecommunications system of claim 3, wherein the processor is further configured to replace the entire ringback signal with the audio message.

5. The telecommunications system of claim 3, wherein the processor is further configured to replace a portion of the ringback signal with the audio message.

6. The telecommunications system of claim 1, wherein the processor is further configured to select a different message from the message database and send it to the source when the selected audio message is sent to the destination.

7. The telecommunications system of claim 1, wherein the audio message is an advertisement.

8. A telecommunications system configured to replace or overlay a signal normally routed to the source of a communication when the communication is initiated by the source with an audio message, the telecommunications system comprising:
   a message database that stores subscriber specific or third party audio messages; and
   a processor coupled with the message database, the processor configured to:
      select an audio message based on an association between the source and the selected audio message, the association made by a user associated with the destination of the communication, wherein the audio message is selected based at least in part on identifying information associated with the source, the identifying information including at least one of a telephone number associated with the incoming communication and an area code associated with the incoming communication;
      send the selected audio message to the source of the communication, the destination of the communication, or both, such that the audio message can be played to the source, the destination, or both; and cause the audio message to stop playing when the destination responds to the communication.

9. The telecommunications system of claim 8, wherein the processor is further configured to determine whether the destination is available, and if the destination in not available, then to not send the audio message to the source.

10. The telecommunications system of claim 8, wherein the signal normally routed to the source is a ringback signal.

11. The telecommunications system of claim 10, wherein the processor is further configured to replace the entire ringback signal with the audio message.

12. The telecommunications system of claim 10, wherein the processor is further configured to replace a portion of the ringback signal with the audio message.

13. The telecommunications system of claim 8, wherein the processor is further configured to select a different message from the message database and send it to the source when the selected audio message is sent to the destination.

14. The telecommunications system of claim 8, wherein the audio message is an advertisement.

15. A telecommunications system configured to replace or overlay a signal normally routed to the source of a communication when the communication is initiated by the source with an audio message, the telecommunications system comprising:
a message database that stores subscriber specific or third party audio messages; and
a processor coupled with the message database, the processor configured to:
classify the source of the communication, wherein classification of the source of the communication is based at least in part on identifying information associated with the source, the identifying information including at least one of a telephone number associated with the incoming communication and an area code associated with the incoming communication;
select an audio message based on the classification and based on an association between the source and the selected audio message, the association made by a user associated with the destination of the communication
determine whether the destination is available;
if the destination is available, then send the selected audio message to the source of the communication, the destination of the communication, or both, such that the audio message can be played to the source, the destination, or both;
if the destination is not available, then to not send the audio message to the source; and
cause the audio message to stop playing when the destination responds to the communication.

16. The telecommunications system of claim 15, wherein the signal normally routed to the source is a ringback signal.

17. The telecommunications system of claim 16, wherein the processor is further configured to replace the entire ringback signal with the audio message.

18. The telecommunications system of claim 16, wherein the processor is further configured to replace a portion of the ringback signal with the audio message.

19. The telecommunications system of claim 15, wherein the processor is further configured to select a different message from the message database and send it to the source when the selected audio message is sent to the destination.

20. The telecommunications system of claim 15, wherein the audio message is an advertisement.

* * * * *